No. 717,982. PATENTED JAN. 6, 1903.
E. FORTIER.
AUTOMATIC HORSE POWER AND PRESSURE INDICATOR AND RECORDER.
APPLICATION FILED MAR. 7, 1902.
NO MODEL. 2 SHEETS—SHEET 2.
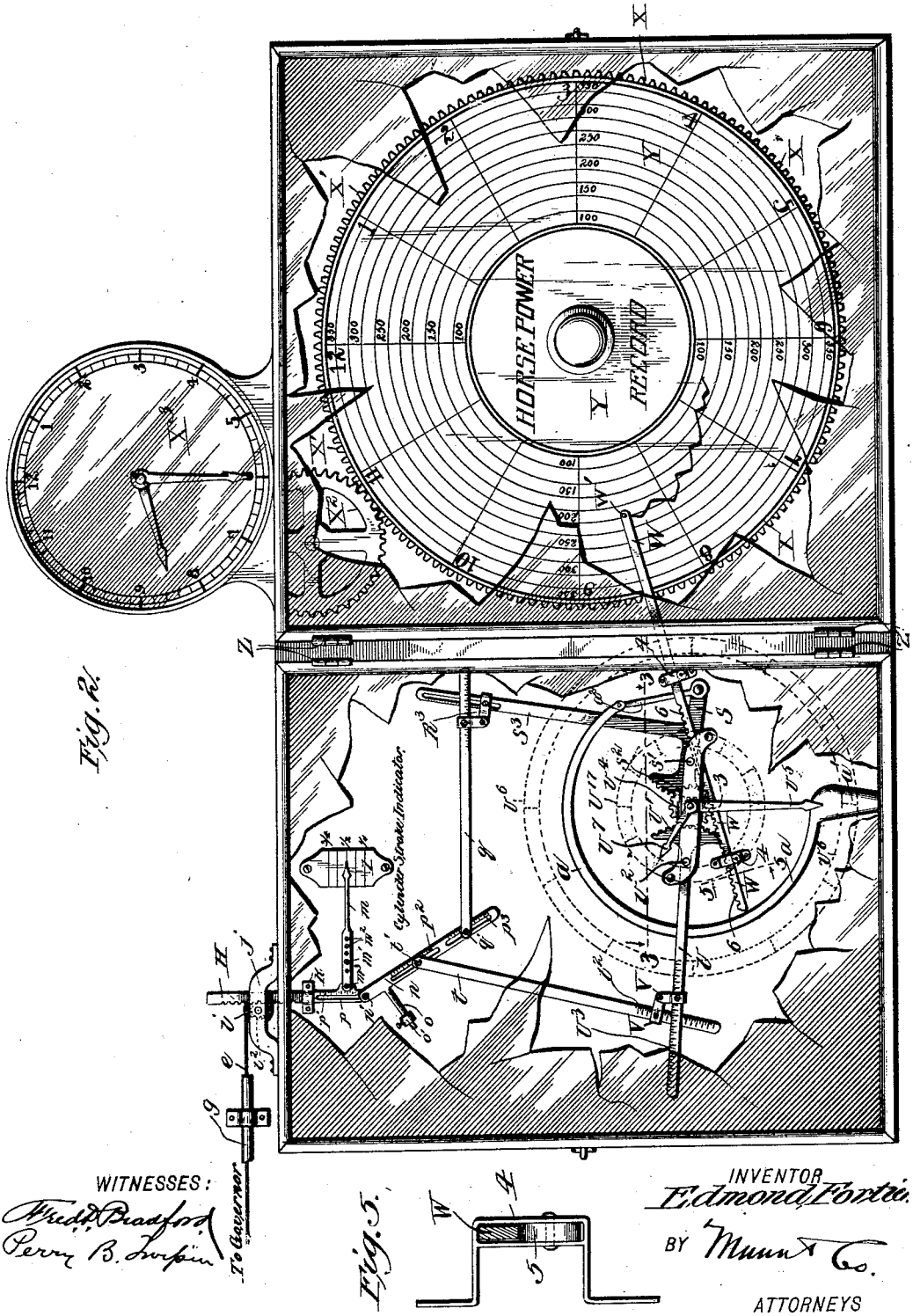

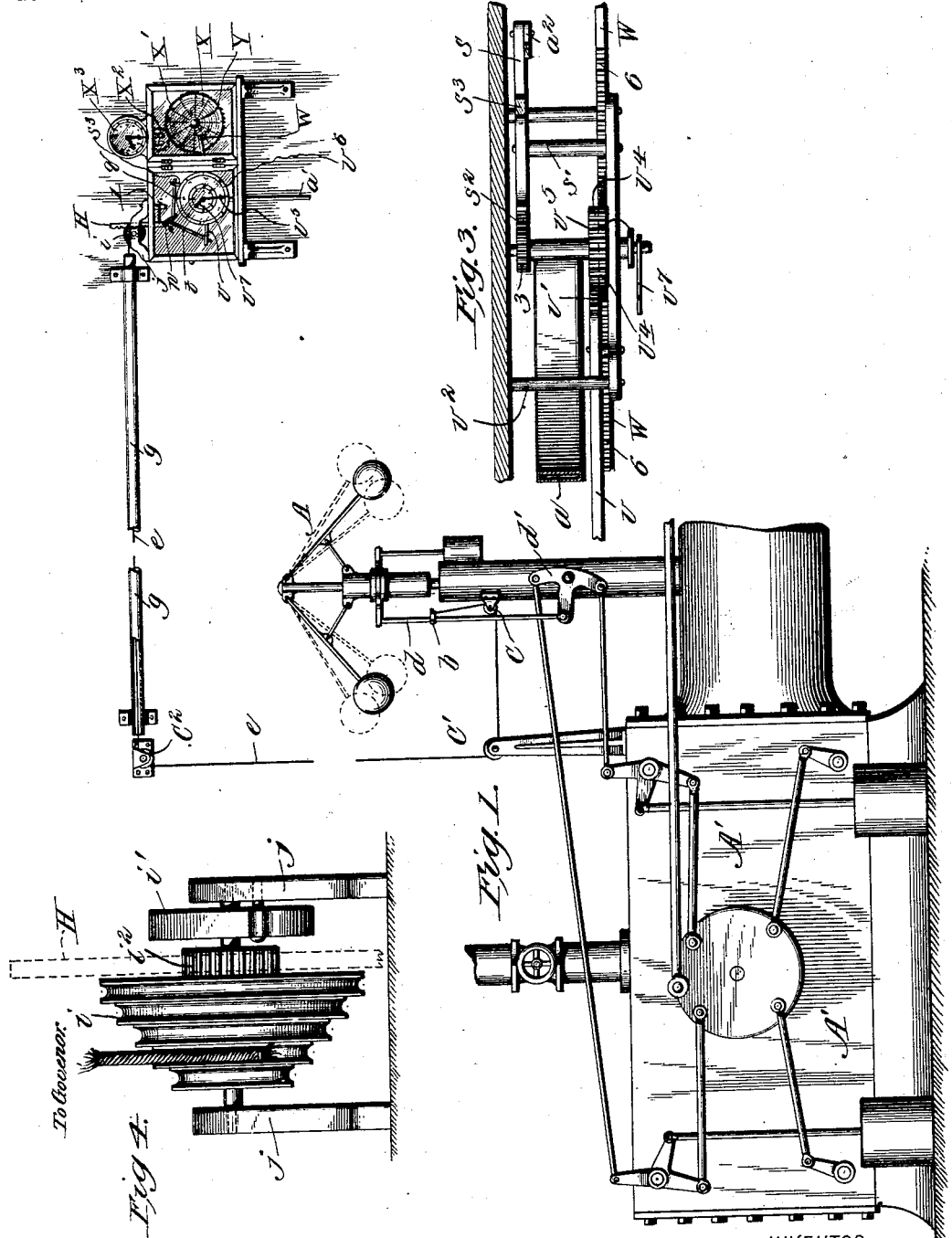

UNITED STATES PATENT OFFICE.

EDMOND FORTIER, OF KANKAKEE, ILLINOIS.

AUTOMATIC HORSE-POWER AND PRESSURE INDICATOR AND RECORDER.

SPECIFICATION forming part of Letters Patent No. 717,982, dated January 6, 1903.

Application filed March 7, 1902. Serial No. 97,091. (No model.)

*To all whom it may concern:*

Be it known that I, EDMOND FORTIER, a citizen of the United States, residing at Kankakee, in the county of Kankakee and State of Illinois, have made certain new and useful Improvements in Automatic Horse-Power and Pressure Indicators, of which the following is a specification.

My invention is an improvement in steam-pressure and horse-power indicators for use on steam-engines, and has for an especial object to provide improvements upon the construction illustrated in my former patent, No. 683,922, dated October 8, 1901; and the invention consists in certain novel constructions and combinations of parts, as will be hereinafter described and claimed.

In the drawings, Figure 1 is a side elevation, partly in section, illustrating my invention in connection with a steam-engine having ball-governors, parts being broken away and others shown in section. Fig. 2 is a face view showing the horse-power record and the steam-pressure and horse-power indicators, together with the cylinder-stroke indicator. Fig. 3 is a detail horizontal section showing the gearing forming part of the steam-pressure and horse-power indicator. Fig. 4 is a side view of the cone-pulley which is connected with the governor, and Fig. 5 is a detail view illustrating one of the guides for the marker-bar of the horse-power recorder.

Referring now to Fig. 1, the centrifugal ball-governor A may be of any usual form and be connected with the steam-engine A' in such manner as to automatically manipulate the inlet and outlet valves in the well-known manner. This governor has a rod $d$, which connects it with the lever $d'$ of the cut-off valve. A cable $e$, of steel or other material, is connected with the governor, preferably by means of a bracket $b$ on the rod $d$, and extends thence over guide-pulleys C, C', and $C^2$ to a cone-pulley $i$, to which the cable is made fast, so the movement of the cable as it is drawn upon by the governor A will operate to turn the pulley $i$ in one direction, a spring-drum $i'$ being arranged to turn the said pulley in the reverse direction, and so take up slack in the cable $e$. The gas-pipe $g$ may be provided over the cable $e$ to protect the same whenever desired. A pinion $i^2$ is connected with the pulley $i$ and is meshed with a rack H, so the said rack H will be moved longitudinally up and down as the pulley $i$ is turned in the manner before described. The pulley $i$ is supported in a bracket $j$, which is fast on the frame or casing of the indicator, and such bracket also forms a guide for the rack H in the longitudinal movements of such rack. A guide or keeper $k$ also aids in keeping the rack H properly guided so it will operate in the desired manner. This rack H is connected with the horse-power indicator and the steam-pressure indicator in the manner presently described.

At $l$ (see Fig. 2) I provide a scale to indicate the different points at which the steam is cut off in the cylinder. A hand or pointer $m$ registers at one end along the scale $l$, is pivoted between its ends on a pin or screw $m'$, which may be adjusted by setting it into any one of the perforations $m^2$ of the pointer $m$, while the other end of the pointer is connected at $m^3$ with the rack H, so the movements of the rack H will operate the pointer $m$ and so indicate the point of cut-off in the cylinder. Near its lower end the rack H is provided with a slot $p$, graduated at $p'$ at one side, as shown in Fig. 2, and the lever $n$ is connected with the rack H by means of a screw $n'$, operating in the slot $p$, so the connection $n'$ may be adjusted up or down along the rack, as may be desired. This lever $n$ has a short projecting arm $o$, which is provided with an adjustable weight $o'$, which may be moved along the arm $o$ and secured in any desired adjustment by a set-screw, as will be understood from Fig. 2. The lever $n$ is provided with slots $p^2$ and $p^3$, alongside of both of which are provided scales or graduations, and bars $t$ and $q$ connect, respectively, with the lever $n$ by means of screws $t'$ and $q'$ operating in the slots $p^2$ and $p^3$, so the connection of the bars $t$ and $q$ with the lever $n$ can be adjusted as may be desired. The bar $t$ being connected at one end with the lever $n$, as described, is connected at its other end with what for convenience of reference I term the "main lever" U, which puts in motion the hand of the horse-power indicator by means of the rack-segment U', as presently described. The lever U is pivoted at $U^2$ and has at its free end a graduation or scale $U^3$, and the free end of the lever $t$ is also graduated at $t^2$, as shown in Fig. 2, and the connection between the bar $t$ and the lever U is effected by means of a double adjustable sleeve V, having sleeve portions fitting both parts $t$ and U and screws by which it can be secured to both the said parts in any desired adjustment. The rack-segment U' meshes with a pinion $U^4$, which carries a horse-power-indicating hand $U^5$, which adjusts along a graduation $U^6$ on the dial, which dial is also provided concentrically with the graduation $U^6$ with a graduation $U^7$, along which registers the steam-pressure-indicating hand presently described.

The bar W, which I call the "marker-bar," as it carries a pencil or ink holder at W' at one end, is movable longitudinally in guide-brackets 4, which are provided with rollers 5, upon which the bar W moves, and has a rack 6, which is meshed by the pinion $U^4$, or, if desired, by another pinion in connection with said pinion $U^4$, so the bar W will be moved longitudinally as the horse-power-indicating hand is moved by the main lever U, as before described. This marker-bar W makes its record upon the horse-power record, which includes a metal plate or other suitable circular carrier X, which is toothed on its outer edge at X' and meshed by a pinion $X^2$, which in turn is geared with a clock $X^3$ and may be supplied with cards Y, suitably inscribed, and which may be secured by thumb-screws or other suitable fastening, so the cards can be changed every twelve hours, the card being arranged to be marked upon by the marker carried by the marker-bar W, as before described. As shown, the horse-power indicator and steam-pressure indicator are supported in one frame and the horse-power record in another frame, such frames being hinged at Z, so they can be folded together whenever desired, the marker-bar W being moved longitudinally clear of the joint Z whenever it is desired to fold the parts of the casing. The steam-pressure indicator includes an expansible tube $a$ of the Bourdon type confined within the gage-casing and connecting at $a'$ with a pipe leading from the steam-boiler of the engine. To the extreme end of this tube $a$ is connected a link $a^2$, which connects with the bell-crank lever S, which is pivoted at S' and has one arm provided with a toothed segment $S^2$, meshing with a pinion 3 on the shaft of the steam-pressure-indicating hand $U^7$, before described. The bell-crank lever S also has an arm $S^3$, which is connected by a double adjustable sleeve $R^3$ with the end of the bar $q$ opposite that connected with the lever $n$, the adjoining ends of the parts $q$ and $S^3$ being graduated so the connection $R^3$ may be accurately set in any desired position and then secured in such position by the clamping-screws, as described.

It will be noticed that I combine the steam-pressure indicator and the horse-power indicator in such manner as to secure an accurate indication upon the same dial of both and arrange the horse-power indicator to operate the recording device and also connect with the means for operating the horse-power-indicator devices, by which to show the different points at which the steam is cut off in the cylinder. Manifestly the direction of the cable leading from the governor to the means for operating the horse-power indicator may be varied in many ways.

Having thus described my invention, what I claim as new, and desire to secure by Letters Patent, is—

1. The combination in an apparatus substantially as herein described, of the steam-pressure-indicating hand, the horse-power-indicating hand operating concentrically with the pressure-gage hand, pinions in connection with said hands, a marker-bar arranged for operation by the pinion of the horse-power-indicating hand, guides for said marker-bar, the main lever having a toothed segment meshing with the pinion of the horse-power-indicating hand, an intermediate lever, a bar connecting said lever with the main lever, a rack-bar to which said intermediate lever is connected, connections between said rack-bar and the governor, a bell-crank lever having a segment meshing with the pinion of the pressure-gage-indicating hand, and a second arm, a bar connecting said second arm with the intermediate lever, and means for operating the pressure-gage indicator, substantially as set forth.

2. The combination of a steam-engine governor, a horse-power indicator, a steam-pressure indicator concentric with the horse-power indicator, connections between the governor and the indicators whereby the governor will operate the indicator, and a horse-power recorder arranged for operation by the horse-power indicator, substantially as set forth.

3. The combination with the steam-engine governor, and the pulley or drum and the spring for operating the same in one direction, of a cable connection between said pulley or drum and the governor, a pinion in connection with said pulley, a rack-bar meshed with said pinion and arranged for operation thereby, a hand or pointer connected with said rack-bar and adapted to operate in connection with a suitable scale to indicate the point of cut-off in the cylinder, an intermediate lever connected with the rack-bar and having an arm and an adjustable weight thereon, the power-indicator having a main lever, the pressure-indicator having a lever, bars connecting both said levers with the intermediate lever, and a power-recorder operating in connection with the power-indicator, substantially as set forth.

4. The combination with the horse-power indicator and the main lever for operating the same, of the steam-engine governor, the cable connected therewith, a pulley or drum to which said cable is connected, means connecting said pulley or drum with the said main lever, and marker devices arranged for operation by the power-indicator.

5. The combination of the power-indicator, the power-recorder, means whereby the power-indicator operates the recorder, the series of levers geared in connection with the power-indicator, the governor and intermediate devices between said governor and the series of levers, all substantially as and for the purposes set forth.

EDMOND FORTIER.

Witnesses:
A. L. GRANGER,
E. G. RICHER.